United States Patent
Goldberg et al.

(10) Patent No.: US 6,717,720 B2
(45) Date of Patent: Apr. 6, 2004

(54) HERMETIC PUMP MODULE FOR DOUBLE CLADDING FIBER AMPLIFIERS AND METHOD FOR MAKING SAME

(75) Inventors: Lew Goldberg, Fairfax, VA (US); Marc LeFlohic, Saint Quey Perros (FR); Gabor Kulcsar, Lannion (FR)

(73) Assignee: Keopsys, Inc., Fairfax, VA (US)

( * ) Notice: Subject to any disclaimer, the term of this patent is extended or adjusted under 35 U.S.C. 154(b) by 70 days.

(21) Appl. No.: 09/994,788

(22) Filed: Nov. 28, 2001

(65) Prior Publication Data

US 2002/0136505 A1 Sep. 26, 2002

Related U.S. Application Data (60) Provisional application No. 60/273,325, filed on Jun. 6, 2001.

(51) Int. Cl.[7] .............................................. H01S 3/00
(52) U.S. Cl. ................................................ 359/341.3
(58) Field of Search ....................... 372/70; 359/341.3, 359/341.32

(56) References Cited

U.S. PATENT DOCUMENTS

| | | | | |
|---|---|---|---|---|
| 4,944,569 A | * | 7/1990 | Boudreau et al. | 385/95 |
| 5,265,113 A | * | 11/1993 | Halldorsson et al. | 372/36 |
| 5,574,811 A | * | 11/1996 | Bricheno et al. | 385/52 |
| 5,642,448 A | * | 6/1997 | Pan et al. | 385/31 |
| 5,854,865 A | * | 12/1998 | Goldberg | 385/31 |
| 5,917,648 A | * | 6/1999 | Harker | 359/341.3 |
| 5,923,481 A | * | 7/1999 | Skidmore et al. | 359/819 |
| 6,270,263 B1 | * | 8/2001 | Iwase et al. | 385/92 |
| 6,310,717 B1 | * | 10/2001 | Naganuma et al. | 359/341.1 |
| 6,334,020 B1 | * | 12/2001 | Fujimori et al. | 385/134 |
| 6,529,657 B2 | * | 3/2003 | Goldberg et al. | 385/31 |
| 6,547,451 B1 | * | 4/2003 | Nishikawa et al. | 385/88 |
| 2002/0027937 A1 | * | 3/2002 | Govorkov et al. | 372/75 |
| 2002/0071460 A1 | * | 6/2002 | Goldberg et al. | 372/36 |
| 2002/0094159 A1 | * | 7/2002 | Goldberg et al. | 385/27 |
| 2002/0110335 A1 | * | 8/2002 | Wagner et al. | 385/89 |
| 2002/0171918 A1 | * | 11/2002 | Clapp | 359/342 |
| 2003/0021529 A1 | * | 1/2003 | Murray et al. | 372/50 |

FOREIGN PATENT DOCUMENTS

| | | | | |
|---|---|---|---|---|
| JP | 62-285448 | * | 11/1987 | H01L/23/02 |

* cited by examiner

*Primary Examiner*—Thomas G. Black
*Assistant Examiner*—Deandra M. Hughes
(74) *Attorney, Agent, or Firm*—Andrews Kurth LLP (57) ABSTRACT

An apparatus and method of hermetically sealing a pump module for a double cladded fiber in a pump module. The apparatus includes a hermetic pump module for coupling light from a pump source into an optical waveguide. The hermetic pump module includes a hermetically sealed housing, wherein the hermetically sealed housing contains an all-glass double cladded fiber with an outer cladding, an inner cladding, and a core, wherein the double cladded fiber includes a v-groove that extends through the outer cladding into the inner cladding, a pump source that emits a light, and a transparent substrate, bonded to the glass outer cladding with a transparent adhesive, wherein the light passes through the transparent substrate and into the all-glass double cladded fiber and the v-groove couples the light into the all-glass double cladded fiber. Alternatively, the substrate may be eliminated and the light directly coupled into the all-glass double cladded fiber.

41 Claims, 11 Drawing Sheets

FIG. 1A

*(PRIOR ART)*

FIG. 1B

*(PRIOR ART)*

HERMETIC PUMP MODULE FOR DOUBLE CLADDING FIBER AMPLIFIERS AND METHOD FOR MAKING SAME

CROSS-REFERENCE TO RELATED APPLICATIONS

This application hereby claims the benefit of the priority of U.S. Provisional Patent Application, Ser. No. 60/273,325, filed Mar. 6, 2001, which is hereby incorporated by reference. This application also incorporates by reference U.S. patent application, Ser. No. 09/733,988, entitled "High Power Fiber Amplifiers With Passive Pump Module Alignment" and filed Dec. 12, 2000 and U.S. Pat. No. 6,529,657, entitled "Angle Selective Side-Pumping Of Fiber Amplifiers And Lasers" and published Mar. 4, 2003.

BACKGROUND

1. Technical Field

The present invention is related to fiber amplifiers, and more particularly to packaging for double cladding fiber amplifiers.

2. Description of Related Art

Double cladding fiber structures (e.g., as shown in U.S. Pat. No. 4,815,079, "Optical fiber lasers and amplifiers") have been demonstrated to be an effective approach (e.g., as shown in L. Goldberg, J. P. Koplow, D. Kliner, "Highly efficient 4-W Yb-doped fiber amplifier pumped by a broad stripe laser diode", Optics Lett., v. 15, pp. 673–675, 1999) for implementing high power fiber lasers and amplifiers. In a double cladding fiber, a single mode doped core is surrounded by a large (typically 100–200 $\mu$m), multimode inner cladding, which is in turn surrounded by an outer cladding. The pump light propagates in the large, multimode inner cladding and is gradually absorbed by the active dopant in the fiber core. Since double cladding fibers are typically pumped by non-diffraction limited broad stripe lasers diodes, maximizing of the inner cladding NA makes it possible to use a larger angular cone of incident pump light. This in turn allows the of use larger de-magnification factors for focusing the pump source onto the fiber, and the use of broad stripe laser diodes with a larger stripe widths and output power. The inner cladding numerical aperture is given by NA=$n\sqrt{2\Delta n}$ where n=1.46 is the refractive index of a silica inner cladding, and $\Delta n \cong (n-n_{clad})/n$ is the normalized index difference between the inner and outer cladding.

Using polymers as the outer cladding material, refractive index of 1.34 (Teflon) to 1.41 (Silicone) are possible, resulting in an inner cladding numerical aperture in the range of NA=0.60 to 0.38. Double cladding fibers can also be fabricated with a glass outer cladding, resulting in an all-glass fiber structure (except for a polymer outer protective jacket). A refractive index difference between the silica inner cladding and the outer cladding is obtained by using a glass with a different composition and lower refractive index for the outer cladding. With fluorinated silica glass outer cladding, numerical apertures up to 0.25 can be achieved for the inner cladding.

An effective method for coupling the emission of a broad area pump diode into the inner cladding of a double cladding fiber is through a v-groove (e.g., as shown in U.S. Pat. No. 5,854,865, "Method and Apparatus for Side-Pumping of Optical Fiber") fabricated into the fiber. The method makes it possible to couple the pump light directly into the fiber with high efficiency. In one implementation, shown in FIGS. 1A–1B, the emission of a broad stripe laser diode is collected by a micro-lens and then focused onto the v-groove facet. When the incident pump light is confined, in the yz plane (see FIGS. 1A–1B), to angles ranging from −2.6° relative the vertical to an angle of arcsin(NA) on the other side of the vertical, the light is reflected by total internal reflection at the v-groove facet and couples into the inner cladding of the fiber. The positive angle limit above represents the maximum propagation angle allowed by the numerical aperture of the inner cladding, and varies from 22° for NA=0.38 to 37° for NA=0.6, both measured in air. Using the v-groove technique, a total diode-to-fiber coupling efficiency of up to 90% can be achieved.

Alternatively, v-groove coupling can be implemented without any lenses between the diode and the fiber (e.g., as shown in L. Goldberg, J. Pinto, "Double cladding fiber amplifiers with lens-less side-pumping," paper CFC1, CLEO, 2000). In the lens-less coupling arrangement, the light from the pump diode is allowed to diffract freely and is intercepted by both v-groove facets resulting in coupling of pump light into both sides of the double cladding fiber.

In the prior art, when a conventional double cladding fiber with a polymer outer cladding is used, a hermetic seal can not be achieved since the polymer is permeable to moisture. This polymer can not be removed in the section inside the ferrule since any metallization of the inner cladding fiber surface would result in absorbing the pump light propagating in the inner cladding of the fiber.

SUMMARY OF THE INVENTION

An advantage of the present invention is that it overcomes the disadvantages and shortcomings of the prior art. A novel method is disclosed for constructing high power fiber amplifiers with hermetically sealed laser diode pump module. The amplifier uses double cladding fibers (e.g., as shown in U.S. Pat. No. 4,815,079, "Optical Fiber Lasers and Amplifiers"), and a v-groove side-pumping technique (e.g., as shown in U.S. Pat. No. 5,854,865, "Method and Apparatus for Side-Pumping of Optical Fiber") that directly couples the pump light into the fiber. Another advantage of the present invention is that it provides a method and apparatus for hermetically sealing the pump diode by using a double cladding fiber with an all-glass construction is described. In a double cladding fiber with an all-glass construction, the outer cladding is preferably made of glass, allowing a hermetic seal to be created between the outer fiber surface and the inside surface of ferrule attached to the hermetic package. To form a hermetic seal, the double cladding fiber is preferably metal-coated and then soldered inside the ferrule.

Yet another advantage of the present invention is that it achieves high efficiency of coupling the pump diode into the fiber. This advantage may be achieved due to the use of a microlens to collect the light from the laser diode and re-focus it onto the surface of the v-groove at a divergence that is less than the relatively low numerical aperture of the inner cladding in an all-glass double cladding fiber.

Another advantage of a hermetic package according to an embodiment of the present invention is the use of a removable ferrule that allows both sides of the double cladding fiber to be inserted into ferrules attached to the module enclosure. An additional advantage of the present invention is the use of a detachable ferrule that allows the assembly of a pump module with a continuous length of fiber pigtails on both sides of the module.

Still another advantage of the present invention is that it allows hermetic packaging of double cladding pump modules. This advantage may be achieved by the use an all glass double cladding fiber to allow a hermetic seal to be formed by soldering the metallized fiber inside ferrules. Another advantage of the present invention is that it provides a method of assembling the key components of the amplifier, including the pump diode, the microlens and the fiber with the v-groove, inside the hermetic enclosure. Yet another advantage of the invention is that it provides a means of focusing the pump light into the all glass double cladding fiber with an angular divergence cone which is less that the 0.25 numerical aperture of the fiber inner cladding.

These and other advantages are achieved by a hermetic pump module for coupling light from a pump source into an optical waveguide. The hermetic pump module includes a hermetically sealed housing, wherein the hermetically sealed housing contains an all-glass double cladded fiber with an outer cladding, an inner cladding, and a core, wherein the double cladded fiber includes a v-groove that extends through the outer cladding into the inner cladding, a pump source that emits a light, and a transparent substrate, bonded to the glass outer cladding with a transparent adhesive, wherein the light passes through the transparent substrate and into the all-glass double cladded fiber and the v-groove couples the light into the all-glass double cladded fiber. The substrate may be anti-reflection (AR) coated on the pump source side to reduce Fresnell reflection.

Alternatively, these and other advantages are achieved by a hermetic pump module, without a substrate, for coupling light from a pump source into an optical waveguide. The hermetic pump module includes a hermetically sealed housing, wherein the hermetically sealed housing contains an all-glass double cladded fiber with an outer cladding, an inner cladding, and a core, wherein the double cladded fiber includes a v-groove that extends through the outer cladding into the inner cladding, and a pump source that emits a light. Use of a substrate is eliminated in this embodiment of the hermetic pump module and instead light from the pump source is coupled through a side-wall of the fiber directly into the fiber by the v-groove. As with the substrate in the previous embodiment above, the side-wall of the fiber may be AR coated to reduce Fresnell reflection. These and other advantages are also achieved by a method of assembling a hermetic pump module that couples light from a pump source into an optical waveguide. The method includes the steps of coarsely positing a microlens mount inside a hermetic housing, fabricating a v-groove in an all-glass double cladded fiber, bonding the all-glass double cladded fiber to a fiber mount, precisely positioning the microlens holder and the fiber mount relative to each other and a diode in the hermetic housing to maximize pump coupling of light emitted from the diode onto the v-groove and into the all-glass double cladded fiber, and covering the hermetic housing in order to hermetically seal the hermetic housing. The microlens mount includes a microlens.

BRIEF DESCRIPTION OF THE DRAWINGS

The detailed description will refer to the following drawings, in which like numbers and letters refer to like items, and in which.

DETAILED DESCRIPTION OF THE INVENTION

Figure 1A:
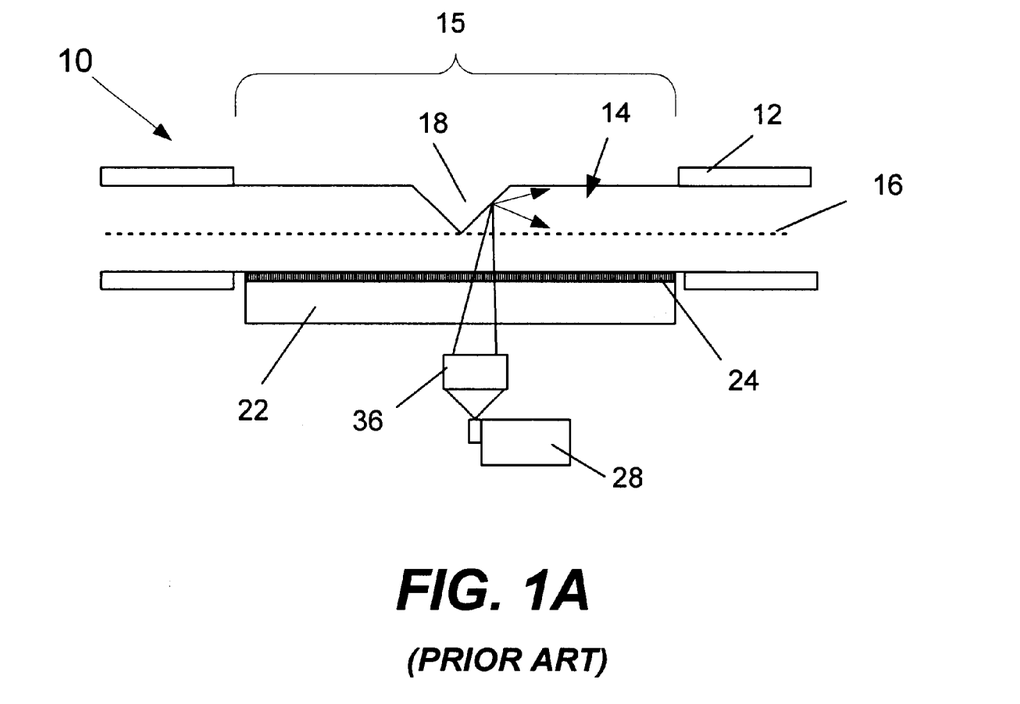
FIGS. 1A–1B are schematic diagrams illustrating prior art fiber amplifiers with v-groove pumping of a double cladding fiber with a polymer outer cladding.
Figure 1B:
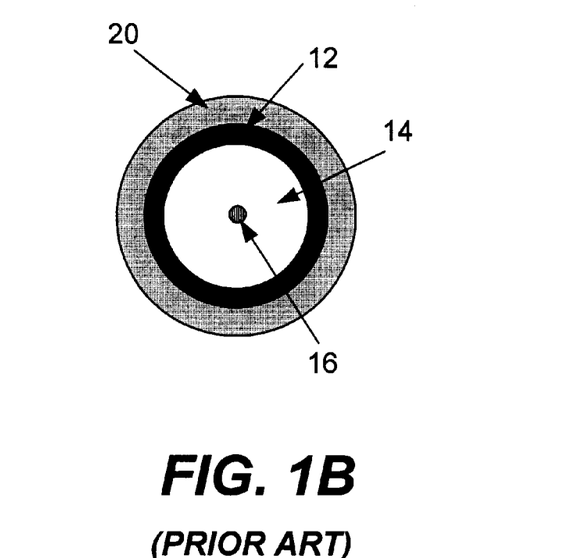

With reference now to FIGS. 1A–1B and 2A–2B, two embodiments of v-groove coupling of a laser diode 28 to a double cladding fiber 10 are shown. In FIGS. 1A–1B, a conventional (prior art) double cladding fiber 10 with a polymer outer cladding 12, an inner cladding 14, and a core 16 is used. For mechanical support, the fiber 10 is mounted on a transparent substrate 22 placed under a v-groove 18. The jacket 20 and polymer outer cladding 12 is stripped from a section 15 of the fiber 10 that lies directly above the substrate 22. Stripping the jacket 20 and outer cladding 12 is preferable in order to minimize the distance between the laser diode 28 microlens 26 (which has a short working distance) and the v-groove 18, to assure good adhesion of the fiber 10 to the substrate 22, and to eliminate optical distortion that would occur if the pump beam were propagated through the relatively uneven surface of the polymer jacket 20.

With the outer cladding 12 stripped in the section above the substrate 22, a low refractive index transparent adhesive 24 is preferably used to bond the fiber 10 to the substrate 22. The transparent adhesive preferably has a low refractive index to preserve the guiding properties of the inner cladding 14. Ideally, to preserve the numerical aperture of the inner cladding 14, the refractive index of the adhesive 24 should be equal to or smaller than that of the outer cladding 12. The requirement of a low refractive index may severely restrict the choice of adhesives 24, and may preclude the use of high strength UV and thermally cured epoxies commonly used for assembly of optical components.

Figure 2A:
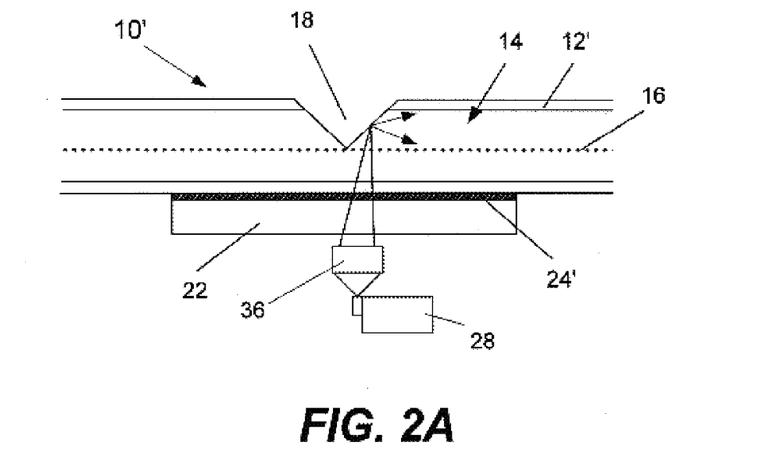
FIGS. 2A–2C are schematic diagrams illustrating fiber amplifiers with v-groove pumping of a double cladding fiber with a glass outer cladding.
Figure 2B:
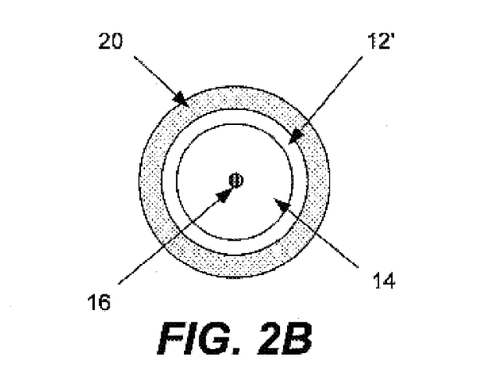
Figure 2C:
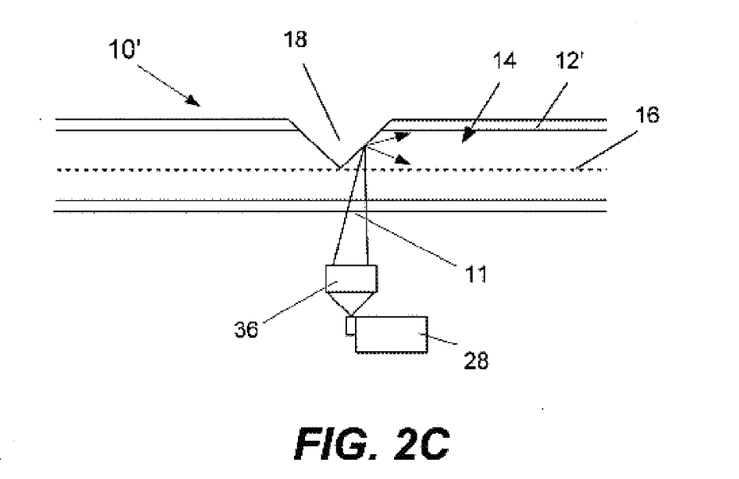

With reference now to FIGS. 2A–2C, alternative v-groove coupling arrangements are shown. The alternative v-groove coupling arrangements shown make use of an all-glass fiber 10' with a glass outer cladding 12'. Since all of the pump light is now completely guided and confined within the inner cladding 14, the pump light does not interact with any material placed in contact with the surface of the glass outer cladding 12'. With reference to FIG. 2A, consequently, any transparent adhesive 24' may be used to attach the fiber 10' to the transparent substrate 22 (as above, the fiber jacket 20 is stripped away from the section above the substrate 22), regardless of the adhesive's 24' refractive index. High strength transparent epoxies with a typical refractive index of 1.5–1.6 can be used in the arrangement of FIG. 2A without causing light in the inner cladding 14 to leak out of the fiber 10'. The capability of using such epoxies significantly improves the ease of amplifier assembly and increases the overall strength and durability of the v-groove-substrate assembly.

With reference now to FIG. 2C, an alternative embodiment is shown in which no substrate 22 is used. The alternative v-groove coupling arrangement shown also makes use of an all-glass fiber 10' with a glass outer cladding 12'. As shown, the pump light is directly incident on a side-wall 11 of the fiber 10'. The v-groove 18 still couples the pump light into the fiber 10. In some situations, it may be difficult to find a transparent adhesive 24' that is acceptable for use inside a hermetic package. Eliminating the substrate 22 eliminates the need for the transparent adhesive 24', obviating this difficulty.

As stated above in the BACKGROUND section, the maximum inner cladding 14 numerical aperture is significantly smaller in an all-glass double cladding fiber 10' than in a double cladding fiber 10 with a polymer outer cladding 12. The maximum inner cladding 14 numerical aperture is approximately 0.25 in an all glass fiber 10'. Efficient v-groove coupling of broad area laser diode 28 emission into the inner cladding 14 of an all glass fiber 10' preferably requires that the pump light is incident at an angle of less than arcsin (the maximum inner cladding 14 numerical aperture)=arcsin (0.25)=14.5° relative to the vertical in the yz plane (see FIGS. 1A–1B and 2A–2B). The maximum negative angle remains −2.6°, dictated by the total reflection requirement at the v-groove surface, so that in yz plane, the total angular cone of the incident light preferably is below 17.1°, corresponding to a numerical aperture of 0.15. A microlens 26 is preferably used to collect the 30–40° wide (FWHM) angular divergence of a typical laser diode 28 (perpendicular to the junction) emission, and as shown in FIG. 2A, to re-focus it on the v-groove 18 facet with a much smaller divergence. This function can be performed by placing the lens surface an appropriate distance from the diode facet so that it images the emission region with a 2–3 times magnification. Since the diode emission region is 0.5–1 μm wide perpendicular to the junction, the magnified spot can still be significantly smaller than a typical v-groove 18 width.

Figure 3A:
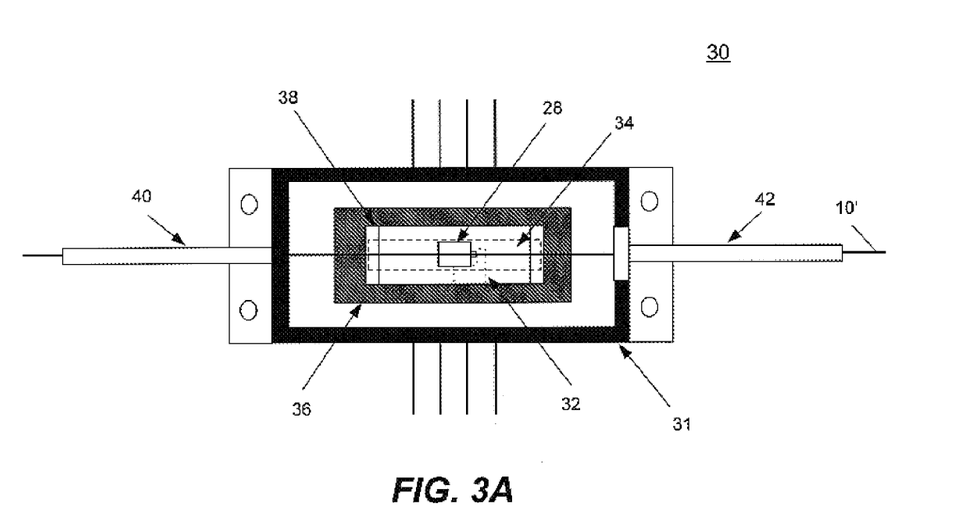
FIGS. 3A–3D are schematic diagrams illustrating components of an exemplary hermetic pump module package.
Figure 3B:
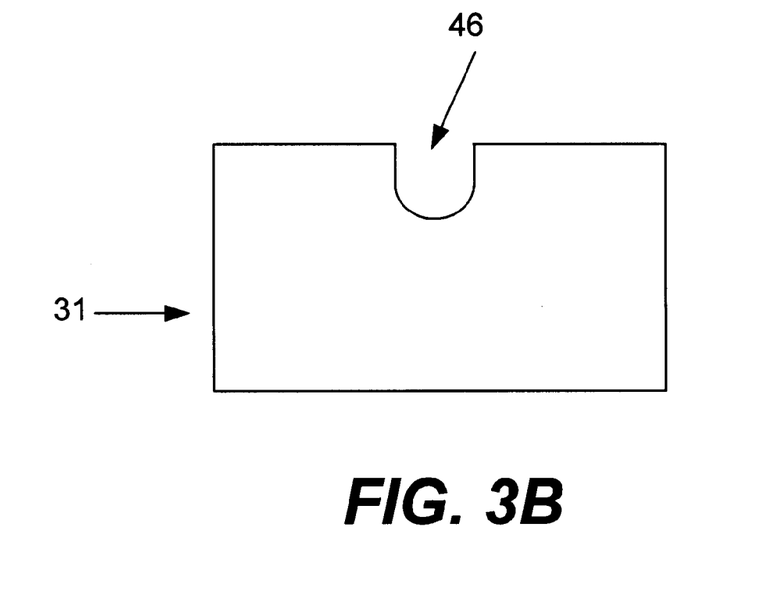
Figure 3C:
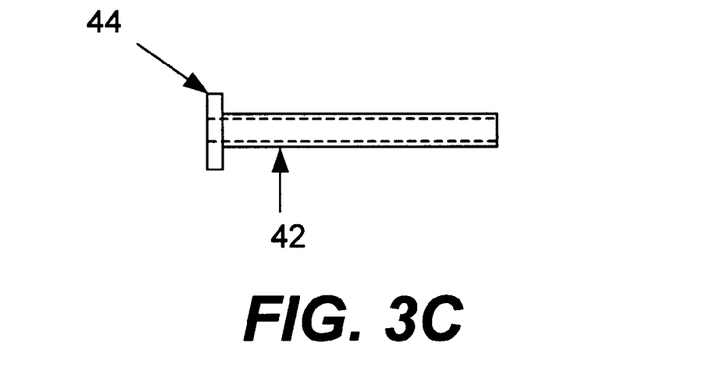
Figure 3D:
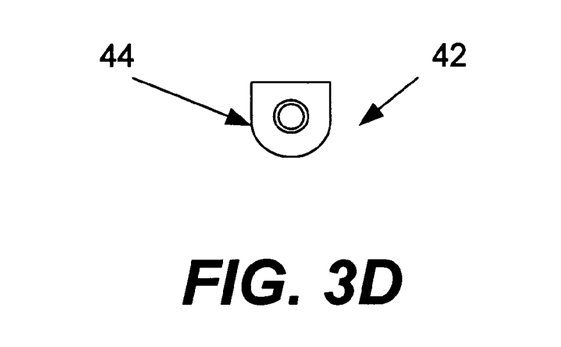

With reference now to FIGS. 3A–3D, an exemplary hermetic pump module 30 utilizing an all-glass fiber 10', such as that shown in FIGS. 2A–2C, is illustrated. The module 30 preferably comprises a hermetically sealed housing 31 with one fixed ferrule 40 and one removable ferrule 42, electrical feed troughs (not shown), and internal components. The electrical feed troughs allow electrical wires or pins to penetrate the hermetic housing 31 end walls while maintaining a hermetic seal and electrical isolation from a metal package (not shown) wall. The metal package typically surrounds the hermetic pump module 30. Such hermetic seals are typically made using an insulating glass or ceramic rings or rectangular pieces which encapsulate the wire and are bonded into the package wall. A wire-to-insulator and insulator-to-wall hermetic seal is typically made using soldering or brazing techniques assuring a gas-tight seal. The fiber 10' is placed through the fixed ferrule 40 and the removable ferrule 42, as shown in FIG. 3A. As shown in FIG. 3C, a side-view of the removable ferrule, and in FIG. 3D, an end-view of the removable ferrule 42, the removable ferrule 42 includes a ferrule flange 44. The ferrule flange 44 is positioned within a flange cutout 46 in an end wall of the housing 31, which is shown in FIG. 3B. The flange 44 and the flange cutout 46 are designed so that the flange 44 is held snugly by the flange cutout 46. The flange 44 is preferably soldered or welded to the housing end wall and the final seal is obtained by welding a lid to the top of the housing and the top surface of the removable ferrule flange 44.

Referring to FIG. 3A, the internal components of the hermetic housing 31 include the pump laser diode 28 mounted on a heat spreader base plate 38 that preferably rests on a thermoelectric cooler 36 (e.g., a Peltier cooler). Two sub-mounts are preferably also included: a micro-lens mount 32 to hold the microlens 26 (not shown in FIG. 3A) and a fiber mount 34 to hold the fiber 10' with the v-groove 18. The two sub-mounts are described below with reference to FIGS. 7A–9B.

Figure 4:
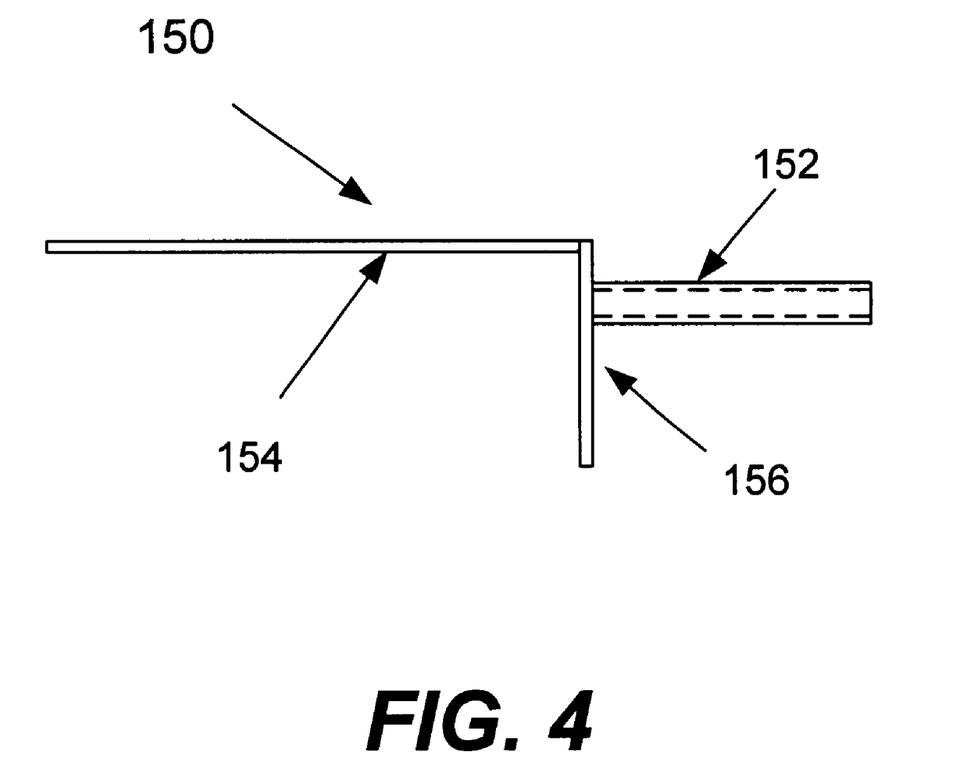
FIG. 4 is a schematic diagram illustrating an exemplary lid of another exemplary hermetic pump module package.

With reference now to FIG. 4, an alternative mechanism for inserting and sealing the fiber 10' in a hermetic enclosure is shown. The alternative utilizes a bent lid 150 with attached ferrule 152. The lid 150 is bent so that the lid 150 includes a top horizontal part 154 and a side vertical wall 156. The ferrule 152 is welded or soldered to the vertical wall 156 of the lid 150. The fiber 10' is inserted into the hermetic housing 31 by first guiding the fiber 10' into the fixed ferrule 40 (see FIG. 3A), then inserting the bent lid 150 with the attached ferrule 152 over the fiber 10' in such a way that the fiber 10' is positioned inside the ferrule 152. The lid 150 is then placed in contact with the top surface and side surface of the hermetic housing 31 and welded or soldered to those surfaces to create a hermetic seal.

Figure 5:
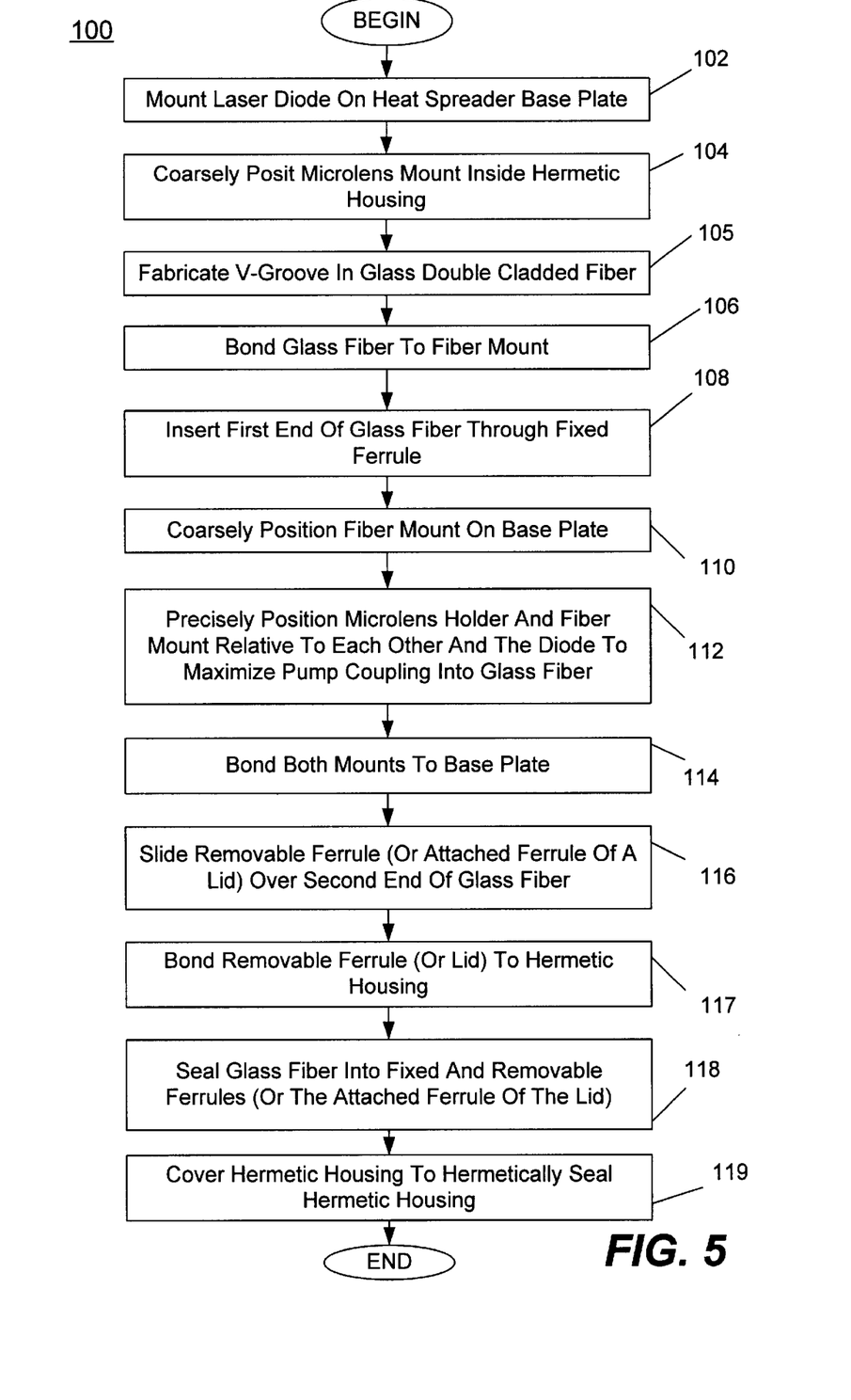
FIG. 5 is a flowchart illustrating an exemplary method of assembling the exemplary hermetic pump module package.

With reference now to FIG. 5, a method 100 of assembling the hermetic pump module 30 is illustrated. The method 100 preferably comprises the following steps: mounting a laser diode on a heat spreader base plate 102, coarsely positing a microlens mount (with a microlens previously mounted in the microlens mount) inside a hermetic housing 104, fabricating a v-groove (using a known method) in a glass double cladded fiber 105, bonding the glass fiber to a fiber mount 106, inserting a first end of the glass fiber through a fixed ferrule 108, coarsely positioning the fiber mount on a base plate 110, precisely positioning the microlens holder and the fiber mount relative to each other and the diode to maximize pump coupling into the glass fiber 112, bonding (e.g., with epoxy, soldering or welding) both mounts to the base plate 114, sliding a removable ferrule (or a lid 150 with an attached ferrule 152) over a second end of the glass fiber 116, bonding (e.g., using soldering or laser welding) the removable ferrule (or the lid 150) to the hermetic housing 117, sealing (e.g., using an epoxy, soldering or laser welding) the glass fiber into the fixed and removable ferrules (or the attached ferrule 152 of the lid 150) 118, and covering the hermetic housing to hermetically seal the hermetic housing 119. If the removable ferrule 42 is used, step 117 is preferably accomplished by bonding the end flange 44 of the removable ferrule 42 to the matching flange cutout 46 in an end wall of the hermetic housing 31. If, alternatively, the lid 150 is used, step 117 and step 119 are preferably accomplished by bonding the lid 150 to the hermetic housing.

Figure 6A:
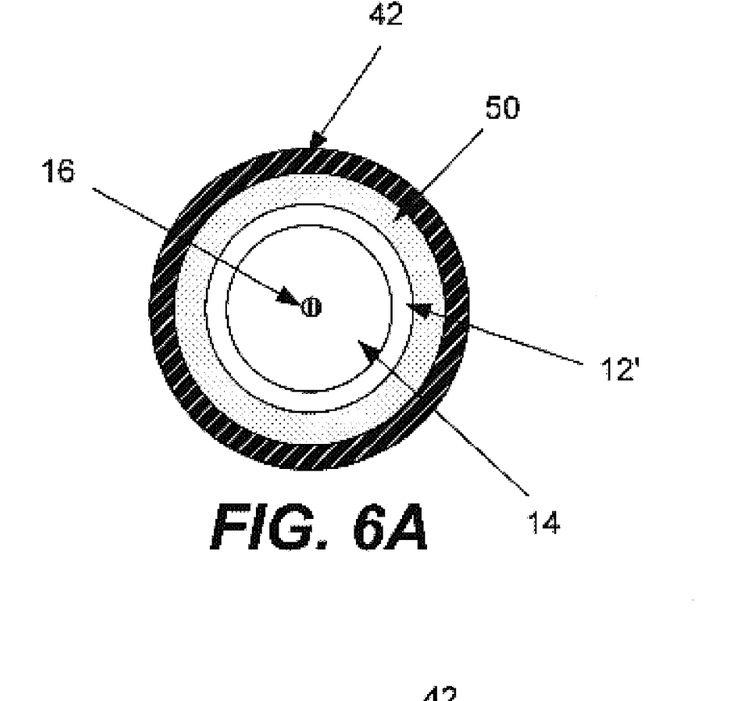
FIGS. 6A–6B are schematic diagrams illustrating exemplary seals of a fiber with a ferrule of the exemplary hermetic pump module package.
Figure 6B:
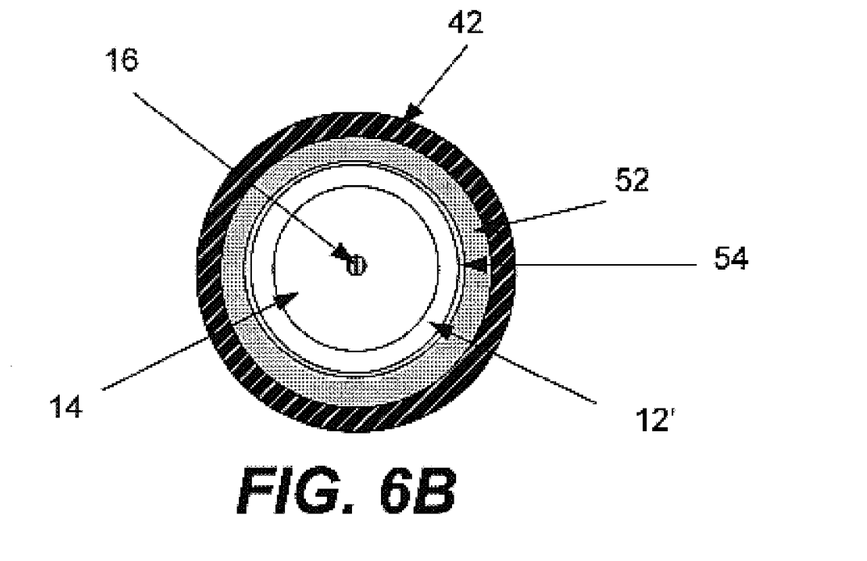

With reference now to FIGS. 6A–6B, alternative manners of sealing the glass fiber 10' into the fixed ferrule 40 and the removable ferrule 42 (corresponding to step 118 of the method 100 shown in FIG. 5) are shown. In FIG. 5A, the sealing step 118 uses an epoxy 50 to seal the space between the outer surface of the all-glass double cladding fiber 10' and the inner surface of the ferrule 40 or 42. The epoxy 50 is preferably inserted between the outer cladding 12' of the fiber 10' (the jacket 20 being stripped off the fiber 10') and the ferrule 40 or 42 using known methods.

In FIG. 6B, the sealing step 118 heats the ferrule 40 or 42 fills the space between the outer surface of the all-glass double cladding fiber 10' and the inner surface of the ferrule 40 or 42 with a liquid metal solder 52. Upon cooling the metal solder 52 solidifies, forming a hermetic seal between the fiber 10' and the ferrule 40 or 42. To solder the fiber 10' into the ferrules 40 or 42, the fiber 10' is preferably first coated by a thin metal coating 54 that adheres to the glass outer cladding 12' and is wetted by the solder metal 52. The coating step is carried out preferably before the fiber 10' is mounted in the fiber mount 34 and before fabrication of the v-groove 18. To prevent metal deposition in the section of the fiber 10' used for v-groove 18 coupling, that fiber 10' section is preferably masked during metallization. After the fiber 10' is sealed in the ferrules 40 and 42, a lid (not shown) is preferably attached to the top of the hermetic housing 31 by soldering or welding.

Figure 7A:
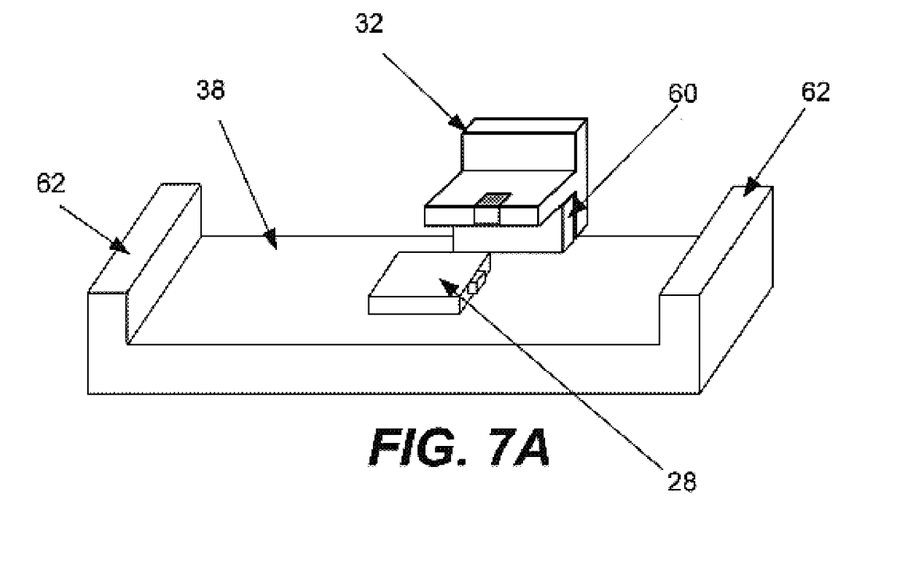
FIGS. 7A–7B are schematic diagrams illustrating an exemplary base plate and lens mount, respectively, of the exemplary hermetic pump module package.
Figure 7B:
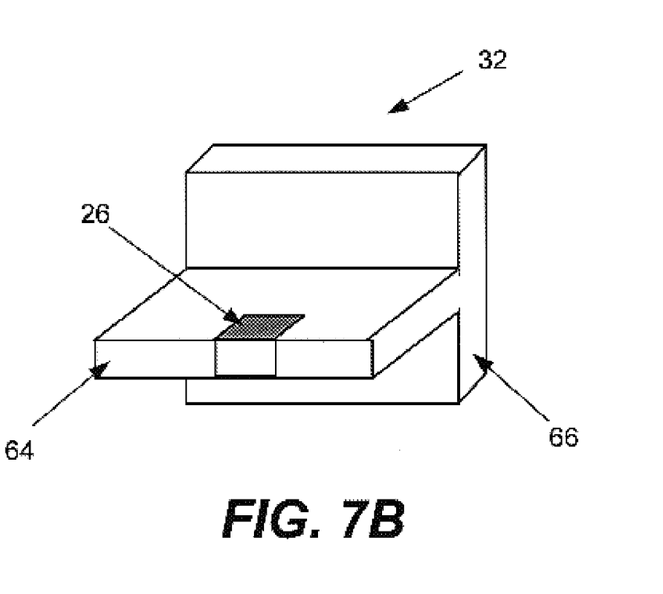

With reference now to FIGS. 7A–7B, a detailed illustration of a microlens mount 32 and the heat spreader base plate 38 is provided. As seen in FIG. 7A, the base plate 38 preferably includes a lens mount ledge 60 and two opposing end ledges 62. As seen in FIG. 7B, the microlens 26 is preferably mounted and bonded to a horizontal flange 64 of the microlens mount 32. The horizontal flange 64 is preferably cantilevered over the laser diode 28 (not shown in FIG. 7B), placing the microlens 26 above the emission area of the laser diode 28. The microlens mount 32 is preferably attached (e.g., step 114 of the method 100 shown in FIG. 5) to the base plate 38 by soldering, welding, or using epoxy to attach a vertical flange 33 of the microlens mount 32 to the lens mount ledge 60 of the base plate 38. The laser diode 28 is preferably also attached to the base plate 38 by soldering, welding, or using electrically and thermally conducting epoxy.

Figure 8A:
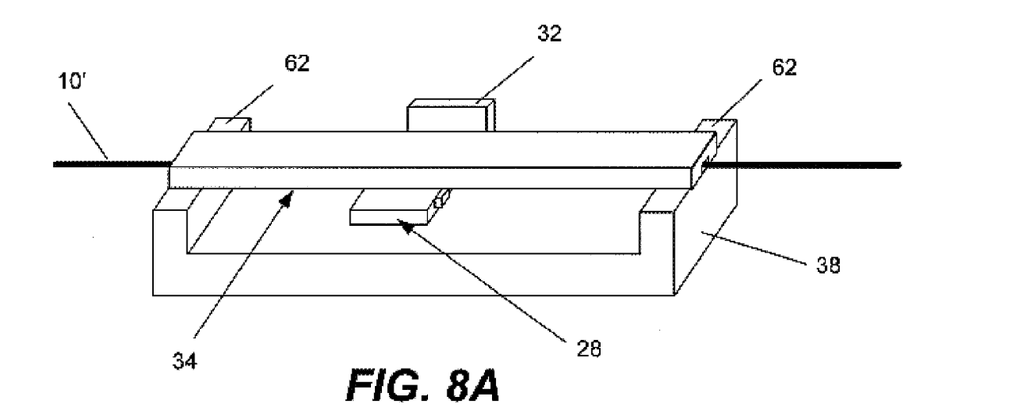
FIGS. 8A–8C are schematic diagrams illustrating an exemplary fiber mount of the exemplary hermetic pump module package.
Figure 8B:
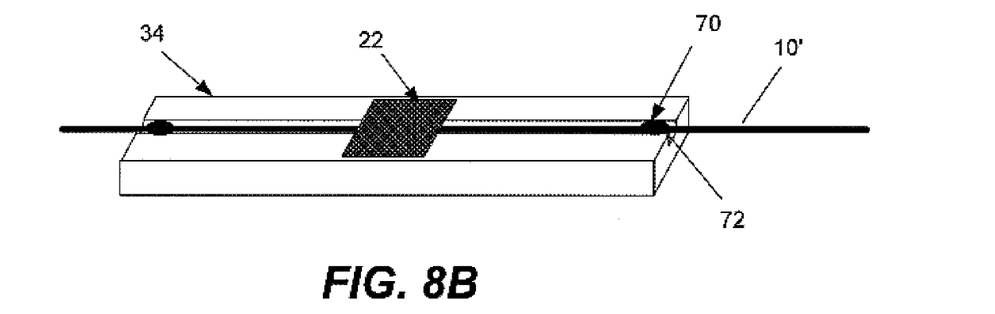
Figure 8C:
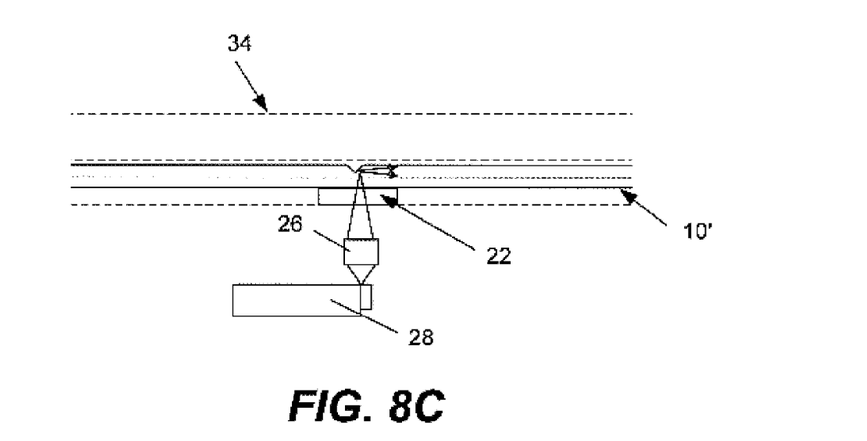

With reference now to FIGS. 8A–8C, an embodiment of the fiber mount 34 and a manner of attaching the fiber mount 34 to the base plate 38 is illustrated. The all-glass fiber 10' is preferably mounted on the transparent substrate 22 that provides mechanical support after the fabricating the v-groove in step 105. As described above with reference to FIG. 2A, with the all-glass double cladding fiber 10', any transparent adhesive 24' can be used to attach the fiber 10' to the substrate 22, regardless of the transparent adhesive 24' refractive index. The substrate 22 is preferably bonded to a metal (or other rigid material) fiber mount 34, with a bottom side (preferably anti-reflective (AR) coated to reduce reflection) of the substrate 22 facing the laser diode 28. Alternatively, as shown in FIG. 2C above, the substrate is eliminated and the pump light is directly incident on the side-wall 11 (not shown in FIGS. 8A–8C) of the fiber 10'. As with the substrate 22, the side-wall 11 may be AR coated to reduce reflection. Either way, the fiber 10' is positioned in a groove 72 in the fiber mount 34. The fiber 10' is preferably bonded (e.g., step 106 of the method 100 shown in FIG. 5), e.g. with an adhesive 70, to ends of the fiber mount, as shown in FIG. 8B. The opposing vertical ledges 62 at each end of the base plate 38 are used for attaching the fiber mount 34 to the base plate 38. The fiber mount 34 is preferably bonded (e.g., step 114 of the method 100 shown in FIG. 5) to the tops of these vertical ledges 62 after the fiber mount 34 is positioned (e.g., step 112 of the method 100 shown in FIG. 4) for maximum pump coupling efficiency.

Figure 9A:
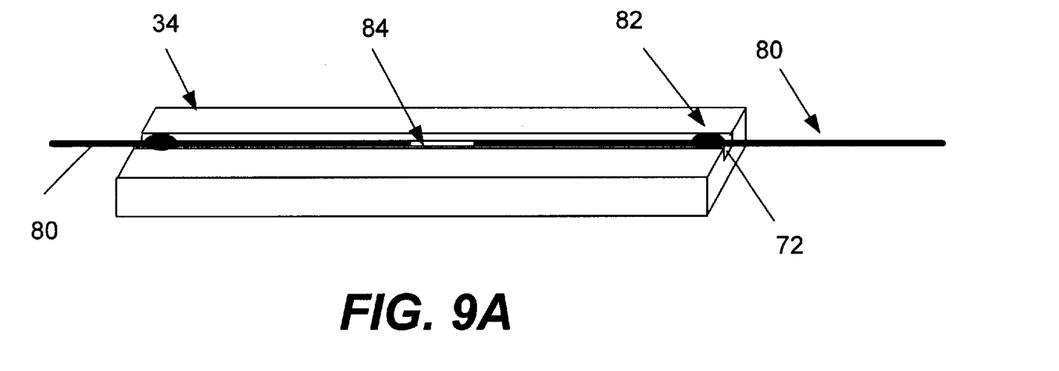
FIGS. 9A–9C are schematic diagrams illustrating another exemplary fiber mount of the exemplary hermetic pump module package.
Figure 9B:
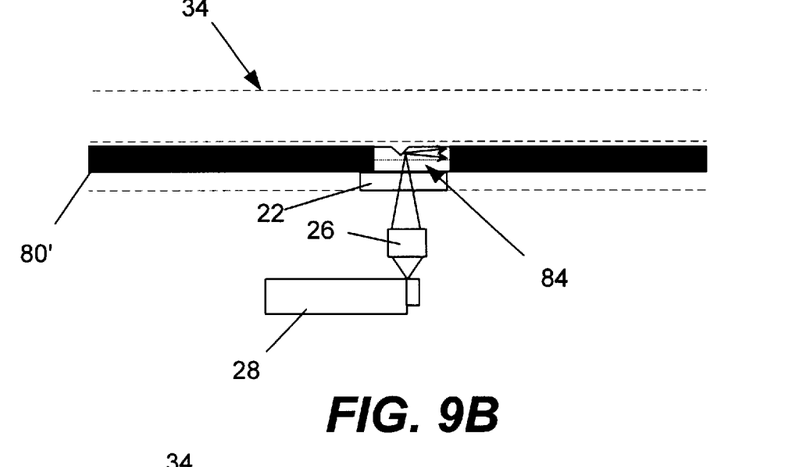
Figure 9C:
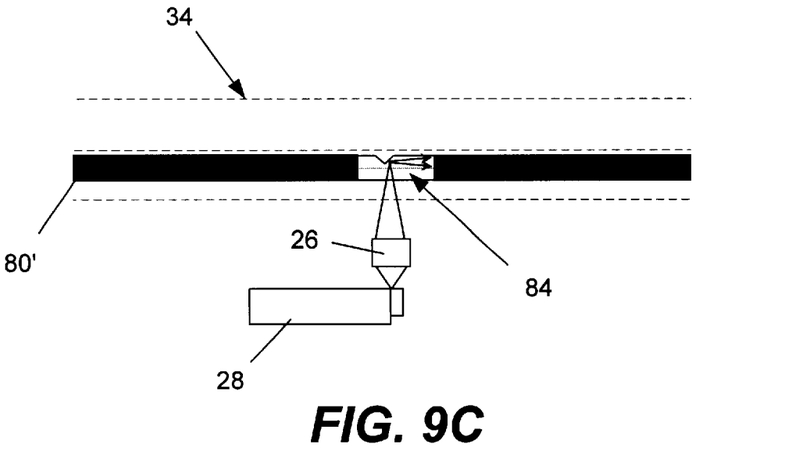

With reference now to FIGS. 9A–9C, an alternative manner of attaching the fiber 10' to the fiber mount 34 is shown. As described above, the fiber 10' is metallized except in a short section 84 in which the v-groove 18 is fabricated and the laser diode 28 pump light is coupled into the fiber 10'. The metallized fiber 80 may be soldered into the groove 72 in the fiber mount 34. The solder 82 may be allowed to flow along the groove 72 so that only the short non-metallized section 84 of the fiber 80 is not wetted by the solder 82. The non-metallized section 84 is preferably substantially shorter than 1 mm. As above, this arrangement may also be implemented without the use of a substrate 22, as shown in FIG. 9C.

Figure 10A:
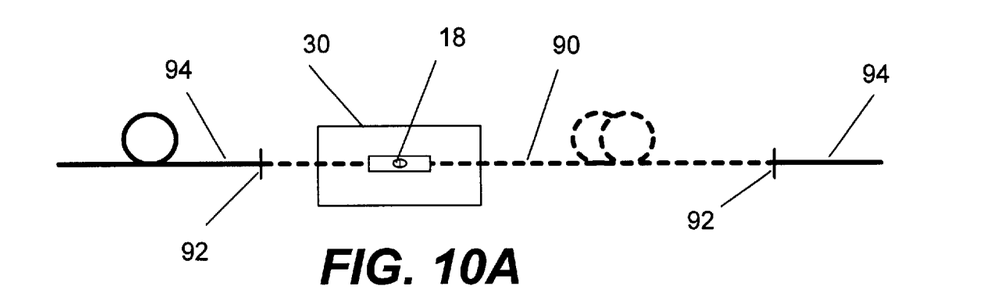
FIGS. 10A–10D are schematic diagrams illustrating various exemplary hermetic pump module package embodiments using different combinations of single mode, undoped double cladding, and doped double cladding fibers.

With reference now to FIGS. 10A–10D, various combinations of different types of fibers, including single mode, doped double cladding and un-doped double cladding, may be used with the hermetic module 30. In FIGS. 10A–10D, the pump light is coupled into the right side of the double cladding fiber. In FIG. 10A, a glass double cladding doped fiber 90 containing a core doped with an active dopant (Er, Yb, Er & Yb, Tm, Nd) is preferably used inside the hermetic module 30 and some distance outside of the hermetic module 30. The glass doped fiber 90 constitutes the active part of the amplifier, and there is a sufficient length of the glass doped fiber 90 on the right side (pumped side) of the hermetic module 30 to provide a desired signal gain. The far right end of the glass doped fiber 90 is fusion spliced 92 to a single mode undoped fiber pigtail 94. In embodiment in which the glass doped fiber 90 is pumped uni-directionally, the un-pumped length of the glass doped fiber 90 on the left side of the hermetic module 30 is preferably minimized to prevent signal absorption. This is preferably accomplished by splicing on a single mode undoped fiber pigtail 94 a short distance outside of the left side hermetic module 30.

Figure 10B:
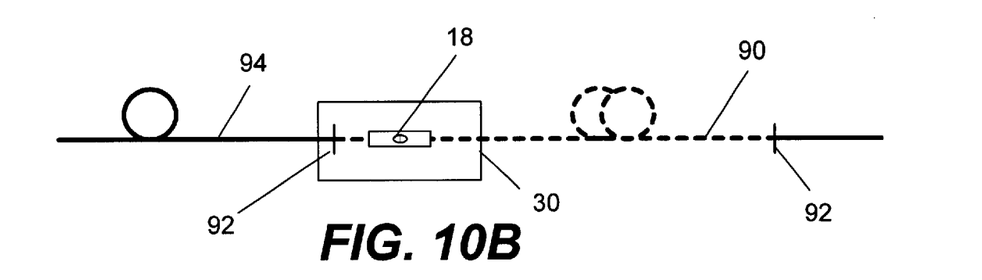
Figure 10C:
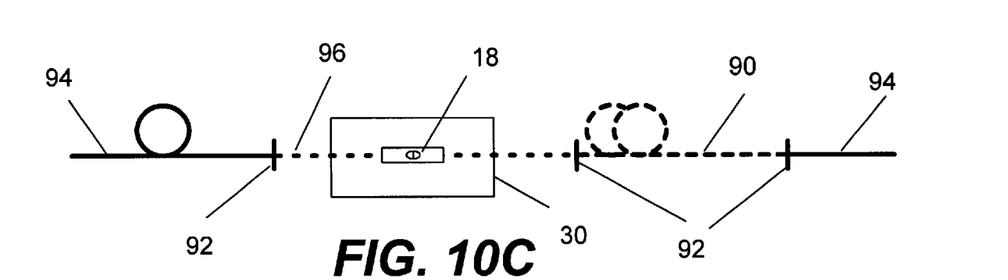
Figure 10D:
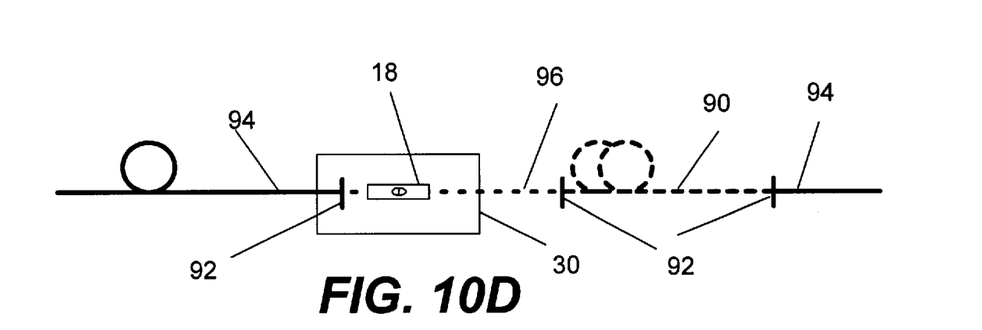

In FIG. 10B, the arrangement is similar to that shown in FIG. 10A except that the fusion splice 92 between the single mode undoped fiber pigtail 94 and the glass doped fiber 90 is inside the hermetic module 30 (e.g., inside the ferrules 40 or 42 of FIG. 3A). Another alternative, shown in FIG. 10C, is to use a length of an all-glass undoped double cladding fiber 96 inside the hermetic module 30 and some distance outside of the hermetic module 30. To construct an amplifier using this arrangement, a doped core double cladding fiber 90' (which in the embodiment shown may have a polymer outer cladding) is preferably fusion spliced 92 to the right end of the all-glass undoped double cladding fiber 96. Single mode fiber pigtails 94 are preferably spliced to far ends of the double cladding fibers 90' and 96. FIG. 10D illustrates a similar embodiment in which the fusion splice 92 between the single mode fiber pigtail 94 and the un-doped glass double cladding fiber 96 is inside the hermetic module 30 (e.g., inside the left ferrule 40 or 42).

While the invention has been described with reference to the exemplary embodiments thereof, those skilled in the art will be able to make various modifications to the described embodiments of the invention without departing from the true spirit and scope of the invention. The terms and descriptions used herein are set forth by way of illustration only and are not meant as limitations. Those skilled in the art will recognize that these and other variations are possible within the spirit and scope of the invention as defined in the following claims and their equivalents.

What is claimed is:

1. A hermetic pump module for coupling light from a pump source into an optical waveguide, comprising:
    a hermetically sealed housing, wherein the hermetically sealed housing contains:
        an all-glass double cladded fiber with a glass outer cladding, an inner cladding, and a core, wherein the double cladded fiber includes a v-groove that extends through the outer cladding into the inner cladding; and a pump source that emits a light wherein the light passes into the all-glass double cladded fiber and the v-groove couples the light into the all-glass double cladded fiber.

2. The hermetic pump module of claim 1, wherein the hermetically sealed housing further contains:

a transparent substrate, bonded to the glass outer cladding with a transparent adhesive, wherein the light passes through the transparent substrate and into the all-glass double cladded fiber.

3. The hermetic pump module of claim 1, further comprising:

a ferrule connected to the hermetically sealed housing, wherein the all-glass double cladded fiber extends outside of the hermetically sealed housing through the ferrule.

4. The hermetic pump module of claim 3, wherein the all-glass double cladded fiber is soldered into the ferrule.

5. The hermetic pump module of claim 3, wherein the all-glass double cladded fiber is sealed into the ferrule with an adhesive.

6. The hermetic pump module of claim 3, wherein the ferrule is detachable from the hermetically sealed housing.

7. The hermetic pump module of claim 3, wherein the ferrule is connected to a lid that covers the hermetically sealed housing.

8. The hermetic pump module of claim 1, wherein the core is undoped.

9. The hermetic pump module of claim 8, further comprising a single mode fiber pigtail, wherein an end of the fiber is fusion-spliced to the single mode fiber pigtail.

10. The hermetic pump module of claim 9, wherein the end of the fiber is outside of the hermetically sealed housing.

11. The hermetic pump module of claim 8, further comprising a doubling cladding fiber with a doped core, wherein an end of the fiber is fusion-spliced to the doubling cladding fiber with a doped core.

12. The hermetic pump module of claim 11, wherein the end of the fiber is outside of the hermetically sealed housing.

13. The hermetic pump module of claim 1, wherein the core is actively doped with one or more dopants chosen from a list consisting of: Er, Yb, Tm, and Nd.

14. The hermetic pump module of claim 1, further comprising a single mode fiber pigtail, wherein an end of the fiber is fusion-spliced to the single mode fiber pigtail.

15. The hermetic pump module of claim 14, wherein the end of the fiber is outside of the hermetically sealed housing.

16. A fiber amplifier comprising the hermetic pump module of claim 1.

17. A fiber laser comprising the hermetic pump module of claim 1.

18. The hermetic pump module of claim 1, further comprising:

a microlens, contained within the hermetically sealed pump housing, wherein the microlens focuses the light from the pump source onto the v-groove.

19. The hermetic pump module of claim 18, wherein the microlens focuses the light from the pump source with a beam divergence less than 0.25 NA.

20. The hermetic pump module of claim 1, wherein the pump source is a laser diode.

21. The hermetic pump module of claim 1, further comprising:

a base plate, contained within the hermetically sealed pump housing, wherein the pump source is mounted on the base plate.

22. The hermetic pump module of claim 21, further comprising:

a microlens that focuses the light from the pump source onto the v-groove; and a microlens mount, connected to the base plate, wherein the microlens mount holds the microlens above an emission region of the pump source.

23. The hermetic pump module of claim 22, wherein the microlens mount is cantilevered above the emission region.

24. The hermetic pump module of claim 21, further comprising:

a fiber mount, connected to the base plate, wherein the fiber is bonded to the fiber mount and the fiber mount positions the v-groove of the fiber above an emission region of the pump source.

25. A method of assembling a hermetic pump module that couples light from a pump source into an optical waveguide, the method comprising the steps of:

coarsely positing a microlens mount inside a hermetic housing, wherein the microlens mount includes a microlens;

fabricating a v-groove in a glass double cladded fiber;

bonding the all-glass double cladded fiber to a fiber mount;

precisely positioning the microlens holder and the fiber mount relative to each other and a diode in the hermetic housing to maximize pump coupling of light emitted from the diode onto the v-groove and into the all-glass double cladded fiber; and covering the hermetic housing in order to hermetically seal the hermetic housing.

26. The method of claim 25, wherein the bonding step bonds the all-glass double cladded fiber to the fiber mount with an epoxy.

27. The method of claim 25, wherein the bonding step bonds the all-glass double cladded fiber to the fiber mount with a solder.

28. The method of claim 25, further comprising the step of:

mounting the laser diode on a heat spreader base plate inside the hermetic housing.

29. The method of claim 28, further comprising the steps of:

coarsely positioning the fiber mount on a base plate; and bonding the microlens mount and the fiber mount to the base plate.

30. The method of claim 25, further comprising the step of:

inserting an end of the all-glass double cladded fiber through a ferrule that is fixed to the hermetic housing.

31. The method of claim 30, further comprising the step of:

sealing the all-glass double cladded fiber into the fixed ferrule.

32. The method of claim 25, further comprising the steps of:

sliding a removable ferrule over an end of the all-glass double cladded fiber, wherein the removable ferrule includes an end flange and the hermetic housing includes a matching flange cutout; and bonding the end flange of the removable ferrule to the matching flange cutout.

33. The method of claim 32, further comprising the step of:

sealing the all-glass double cladded fiber into the removable ferrule.

34. The method of claim 25, further comprising the steps of:
- sliding a lid with an attached ferrule over an end of the all-glass double cladded fiber, wherein the end of the all-glass double cladded fiber is inserted into the attached ferrule; and
- bonding the lid to the hermetic housing.

35. A hermetic pump module for coupling light from a pump source into an optical waveguide, comprising:
- a hermetically sealed housing, wherein the hermetically sealed housing contains:
  - an all-glass double cladded fiber with a glass outer cladding, an inner cladding, and a core;
  - means for emitting a light; and
  - means for coupling the light into the all-glass double cladded fiber; and
- wherein the housing is in close proximity to the all-glass double cladded fiber, the emitting means and the coupling means.

36. A hermetic pump module for coupling light from a pump source into an optical waveguide, comprising:
- a hermetically sealed housing, wherein the hermetically sealed housing contains:
  - an all-glass double cladded fiber with a glass outer cladding, an inner cladding, and a core;
  - means for emitting a light; and
  - means for coupling the light into the all-glass double cladded fiber; and
  - means for enabling the all-glass double cladded fiber to extend outside the hermetically sealed housing while maintaining a hermetic seal.

37. The hermetic pump module of claim 36, wherein the enabling means comprises a ferrule connected to the hermetically sealed housing, wherein the all-glass double cladded fiber extends outside of the hermetically sealed housing through the ferrule.

38. The hermetic pump module of claim 37, further comprising:
- means for hermetically sealing the all-glass double cladded fiber in the ferrule.

39. The hermetic pump module of claim 36, wherein the enabling means comprises a lid with a ferrule, wherein the lid encloses the hermetically sealed housing and the all-glass double cladded fiber extends outside of the hermetically sealed housing through the ferrule.

40. The hermetic pump module of claim 35, wherein the means for coupling comprises:
- a v-groove that extends through the glass outer cladding into the inner cladding of the all-glass double cladded fiber.

41. The hermetic pump module of claim 40, wherein the means for coupling further comprises:
- a transparent substrate, bonded to the glass outer cladding with a transparent adhesive, wherein the light passes through the transparent substrate and into the all-glass double cladded fiber.

* * * * *